Figure 1:
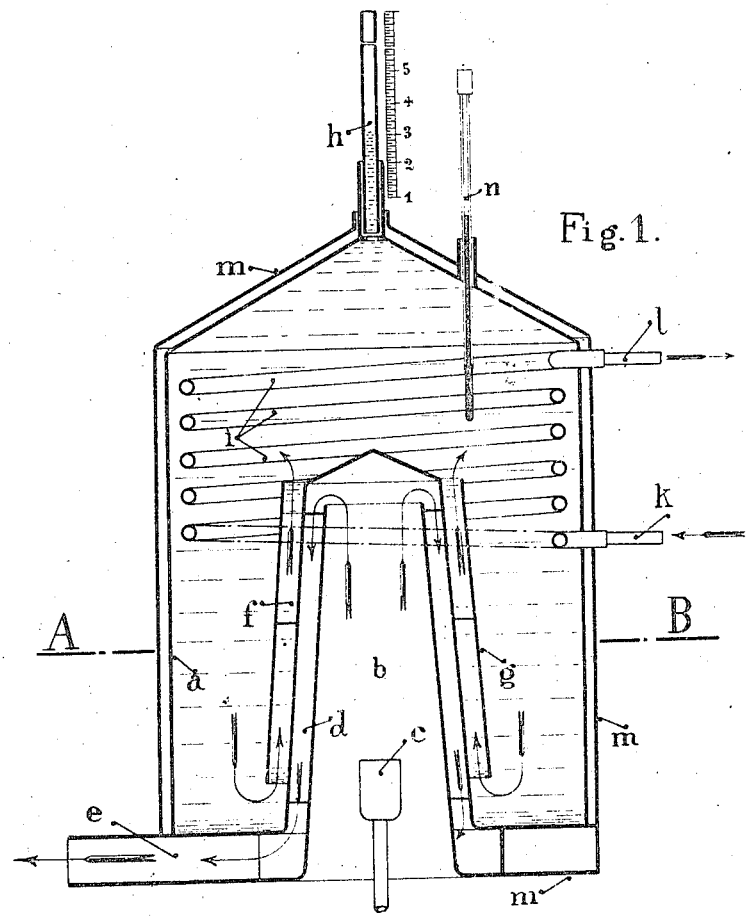

H. JUNKERS.
METHOD AND DEVICE FOR MEASURING THE HEATING VALUE OF FUELS.
APPLICATION FILED OCT. 15, 1913.

1,103,915.

Patented July 14, 1914.

2 SHEETS—SHEET 1.

Witnesses:

Inventor:
Hugo Junkers

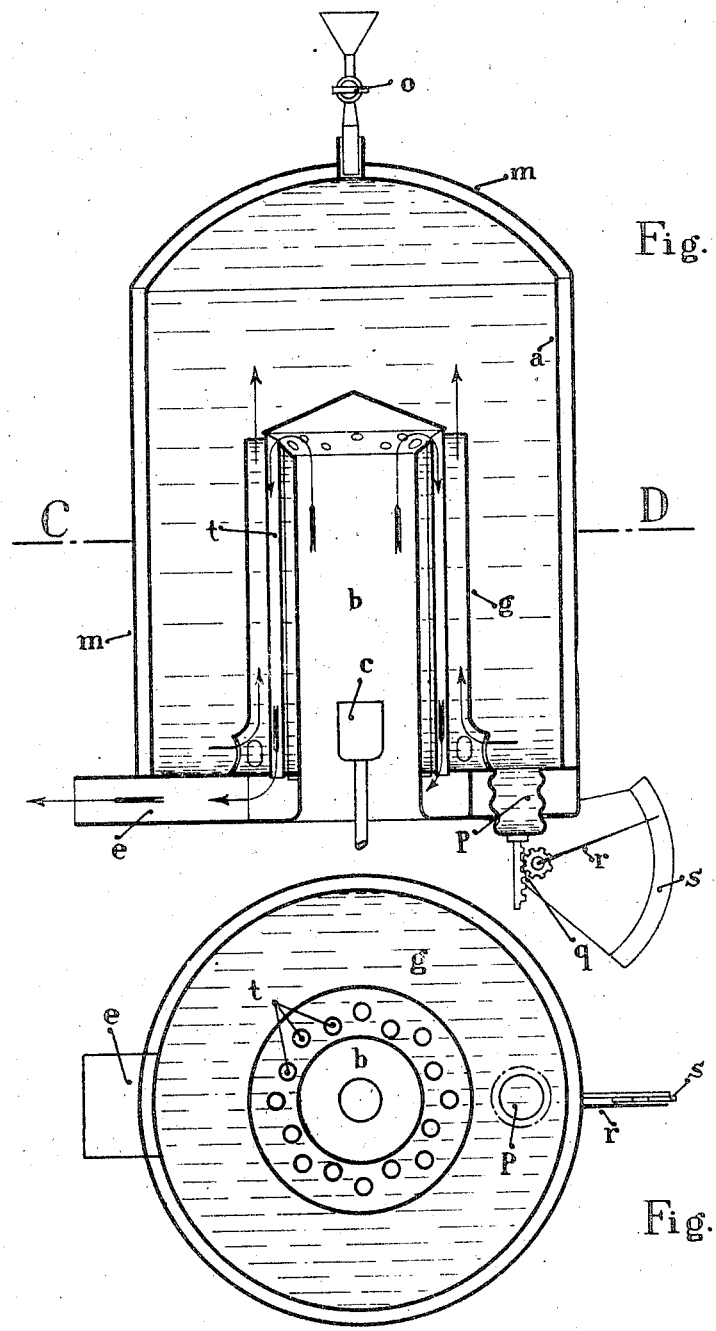

UNITED STATES PATENT OFFICE.

HUGO JUNKERS, OF AIX-LA-CHAPELLE, GERMANY.

METHOD AND DEVICE FOR MEASURING THE HEATING VALUE OF FUELS.

1,103,915.                    Specification of Letters Patent.        Patented July 14, 1914.

Application filed October 15, 1913. Serial No. 795,240.

*To all whom it may concern:*

Be it known that I, HUGO JUNKERS, a citizen of the German Empire, residing at No. 68 Bismarckstrasse, Aix-la-Chapelle, in the Kingdom of Prussia, Empire of Germany, have invented a new and useful Method and Device for Measuring the Heating Value of Fuels; and I do hereby declare the following to be a full, clear, and exact description of the invention, such as will enable others skilled in the art to which it appertains to make and use the same.

This invention relates to an improved method and devices for measuring the heating value of fuels.

Hitherto the calorimetry of fuels, especially the determination of the heating value of solid fuels and many liquid fuels, has been attended with great difficulty, and results of sufficient accuracy have been obtainable only by the employment of the greatest care. If, for example coal be burned in a flow calorimeter, in which the heat of combustion is transmitted to a continuous flow of water, the heating value being ascertained from the difference in temperature of the water entering and leaving the apparatus, it is hardly possible—in view of the peculiar combustion process of coal, in which the volatile constituents are consumed first, and then the residual solid constituents—to maintain uniform disengagement of heat and thus attain the requisite state of equilibrium. The same disability is also met with in the combustion of many liquid fuels, for example the so-called heavy oils, in which also it is hardly possible to obtain uniform combustion of the volatile and heavy constituents. The calorimetric examination of fuels in the so-called bomb apparatus on the other hand presents the drawback that the work is very troublesome and that, in spite of this, suitable results can only be obtained when the requisite corrections are made with the most delicate means available to the physicist and chemist and are taken into account in making the calculations. Consequently the use of the bomb apparatus is restricted to laboratories possessing a scientifically trained staff.

The subject of the present invention is a method for measuring the heating value of fuels, and a calorimeter for carrying out this method, which enables the calorific value of fuels—immaterial whether solid, liquid or gaseous bodies are in question—to be determined with sufficient accuracy in such a simple manner that the apparatus can be operated by any intelligent workman. The economic advantages of this possibility are self evident.

The method consists in using a calorimetric vessel filled with a definite quantity of liquid and allowing the hot gases given off during the combustion of the fuel to flow past heating surfaces which transmit the heat of the gases completely to the liquid contained in the calorimeter. The measurement of the heat, which when divided by the weight of fuel consumed gives the heating value sought, is performed by means of a special measuring device which is attached to the calorimeter and measures the increase in volume sustained by the liquid in consequence of the heating of same. In order that this increase in volume may bear a constant ratio to the amount of heat taken up by the liquid, which ratio, used as a multiplier, gives this amount of heat, use is preferably made of such a liquid as possesses a coefficient of expansion which is independent of the temperature and remains constant within the limits of temperature coming under consideration. Unless this be the case the increase in volume can only stand in a definite ratio to the amount of heat absorbed provided all parts of the liquid are at exactly the same temperature. The attainment of this condition must be attempted by means of a stirring device, kept in operation during the experiment, but this complicates the work and is unreliable, especially in the larger forms of the apparatus. If on the other hand, notwithstanding different increases in temperature, the particles of the liquid expand uniformly in relation to the increase in temperature, the total expansion is just as great as though all the particles were at exactly the same temperature, stirring being in such case unnecessary. According to the researches of the applicant, petroleum for example is admirably adapted for carrying out the method, since its co-efficient of expansion is constant at all the temperatures coming under consideration. On the other hand, water for instance is not very suitable, and its use would render the employment of a stirring device necessary.

In the present method the determination of the heating value is performed in an extremely simple manner by reading off the height of the liquid in the measuring tube of the calorimeter before and after the experiment, multiplying the difference by a constant and dividing the product by the amount of fuel consumed. The only correction needed in any event would be for the exchange of heat with the environment, and this could be determined in a very simple manner, but it has been found that this correction may be neglected if the quantity of liquid contained in the apparatus is so large in relation to the amount of fuel consumed that the liquid is only slightly heated by the combustion.

In order to keep the difference in temperature between the liquid and the room as small as possible the liquid can be adjusted to a desired temperature before each experiment, by means of a special device, when it is not desired to wait for the very long time necessary, in the case of well insulated apparatus, for the temperature to equalize naturally.

The accompanying drawing illustrates two examples of a device for carrying out the invention.

Figure 2:
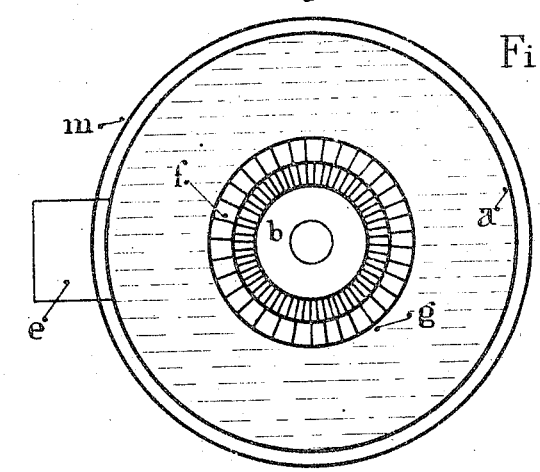

Figure 1 represents a vertical section through the middle of the device. Fig. 2 represents a section on line A B in Fig. 1. Fig. 3 represents a vertical section through the middle of another form of the device. Fig. 4 represents a section on line C D in Fig. 3.

In Figs. 1 and 2, $a$ is the calorimeter vessel containing the measuring liquid; $b$ the combustion shaft, in which the hot gases liberated by the combustion of the fuel in the burner $c$ ascend in order to pass downward again through the heating passages $d$ and escape through the exhaust outlet $e$. The combustion shaft $b$ and heating passages are provided with heat exchanging devices which insure complete transmission of the generated heat to the measuring liquid. In the example shown, the heat is taken up from the gases b, gills arranged in the heating passage $d$ and is given off to the measuring liquid mainly through gills $f$ projecting into that liquid. A more active circulation of the liquid, and therefore an improved transmission of heat to the same are obtained by means of the jacket $g$ which surrounds the gills. A glass tube $h$ fitted with a scale and mounted on the top of the apparatus, is provided for measuring the increase in the volume of the measuring liquid in the form of apparatus shown in Figs. 1 and 2. Special heat exchanging devices are provided for adjusting the initial temperature of the measuring liquid. The example shown is provided, for this purpose, with a coiled tube $i$ terminating in connections $k$ and $l$ through which tube a cooling or heating medium is passed as required. The actual calorimeter vessel $a$ is surrounded by an insulating jacket $m$ to prevent radiation of heat.

Figs. 3 and 4 of the drawing illustrate another form of the apparatus. In this modification another arrangement is adopted for transmitting the heat of the gases of combustion to the measuring liquid. Here the exchange of heat is effected by heating tubes $t$ communicating with the combustion passage $b$ and surrounded by the measuring liquid. The gases of combustion passing from above downward through these heating tubes, give up the whole of their heat to the measuring liquid surrounding the tubes $t$. For measuring the expansion of the liquid, this apparatus is provided with an elastic membrane $p$ the movement of which is transmitted, by means of the pinion gear $q$, to the pointer $r$, the position of which can be read off on the scale $s$. In place of the ascending tube shown in Fig. 1, the apparatus shown in Fig. 3 is provided with a cock $o$ which is closed when the apparatus has been filled, and prevents air from entering and the liquid from escaping.

The calorimeters must, in all cases, be made in such a way that no air bubbles, which would impair the accuracy of the results, can adhere in any part of the chamber containing the liquid. This result can be attained for example by the conical or domed shape given to the top of the measuring vessel in the examples shown.

One and the same apparatus may be used for the calorimetric examination of solid, liquid and gaseous fuels, all that is necessary being to provide a burner suitable for the kind of fuel to be examined in each case.

Having now particularly described and ascertained the nature of my said invention and in what manner the same is to be performed, I declare that what I claim is:—

1. A calorimeter for determining the heating value of fuels, consisting of a vessel whose lower portion is shaped as a hollow casing forming a combustion chamber which is open on its under side and heat transferring devices fitted in the combustion chamber for the purpose of taking up the heat liberated by the combustion of fuels and transmitting it to a liquid, for example petroleum, which fills the said vessel and whose coefficient of expansion is as nearly as possible constant within the range of temperatures used and a measuring device for determining the expansion of the said liquid.

2. A calorimeter for determining the heating value of fuels, consisting of a vessel whose lower portion is shaped as a hollow casing forming a combustion chamber which is open on its under side and heat transferring devices fitted in the combustion chamber for the purpose of taking up the heat liberated by the combustion of fuels and transmitting it to a liquid, for example petroleum, which fills the said vessel and whose coefficient of expansion is as nearly as possible constant within the range of temperatures used and a measuring device for determining the expansion of the said liquid and having a circulation jacket for facilitating the circulation and mixture of the measuring liquid.

3. A calorimeter for determining the heating value of fuels, consisting of a vessel whose lower portion is shaped as a hollow casing forming a combustion chamber which is open on its under side and heat-transferring devices fitted in the combustion chamber for the purpose of taking up the heat liberated by the combustion of fuels and transmitting it to a liquid, for example petroleum, which fills the said vessel and whose coefficient of expansion is as nearly as possible constant within the range of temperatures used and a measuring device for determining the expansion of the said liquid and having a heat-transferring device, for example a coiled tube, suitable for passing a liquid through, for the purpose of adjusting the initial temperature of the measuring liquid.

4. A calorimeter for determining the heating value of fuels, consisting of a vessel whose lower portion is shaped as a hollow casing forming a combustion chamber which is open on its under side and heat-transferring devices fitted in the combustion chamber for the purpose of taking up the heat liberated by the combustion of fuels and transmitting it to a liquid, for example petroleum, which fills the said vessel and whose coefficient of expansion is as nearly as possible constant within the range of temperatures used and a measuring device for determining the expansion of the said liquid in which all the parts which come in contact with the measuring liquid are shaped in such a way as to prevent the adhesion of air.

In testimony thereof I have signed my name to this specification in the presence of two subscribing witnesses.

HUGO JUNKERS.

Witnesses:
 LUDWIG WAGENSEIL,
 ALFRED LILLEY.